(12) United States Patent
Yang (10) Patent No.: US 12,493,230 B2
(45) Date of Patent: Dec. 9, 2025

(54) CAMERA ROTATION DEVICE, MONOCULAR TELESCOPE, AND ROTATION MECHANISM OF MONOCULAR TELESCOPE

(71) Applicant: Chieh-Chou Yang, New Taipei (TW)

(72) Inventor: Chieh-Chou Yang, New Taipei (TW)

( * ) Notice: Subject to any disclaimer, the term of this patent is extended or adjusted under 35 U.S.C. 154(b) by 366 days.

(21) Appl. No.: 18/459,013

(22) Filed: Aug. 30, 2023

(65) Prior Publication Data

US 2025/0020908 A1 Jan. 16, 2025

(30) Foreign Application Priority Data

Jul. 12, 2023 (TW) .................................. 112125922

(51) Int. Cl.
| | |
|---|---|
| *G03B 17/14* | (2021.01) |
| *G02B 23/16* | (2006.01) |
| *G03B 13/10* | (2021.01) |
| *G03B 17/56* | (2021.01) |

(52) U.S. Cl.
CPC ............. *G03B 17/14* (2013.01); *G02B 23/16* (2013.01); *G03B 13/10* (2013.01); *G03B 17/566* (2013.01)

(58) Field of Classification Search
None
See application file for complete search history.

(56) References Cited

U.S. PATENT DOCUMENTS

| | | | | |
|---|---|---|---|---|
| 6,717,727 B2 * | 4/2004 | Barziza | ................... | G03B 17/48 |
| | | | | 359/399 |
| 2022/0308333 A1 * | 9/2022 | Yang | ...................... | G02B 23/16 |

FOREIGN PATENT DOCUMENTS

| | | | | |
|---|---|---|---|---|
| DE | 102006005777 A1 * | 8/2007 | ............ | G03B 17/02 |
| EP | 1403678 B1 * | 11/2007 | ............ | G02B 23/16 |
| JP | 2010107972 A * | 5/2010 | | |

\* cited by examiner

*Primary Examiner* — Rodney E Fuller
(74) *Attorney, Agent, or Firm* — Li & Cai Intellectual Property Office (57) ABSTRACT

A camera rotation device includes a connection tube, a rotation annulus, a resistance annulus, an oil film, and a driver. The rotation annulus and the resistance annulus are respectively sleeved at two opposite sides of the connection tube and are fixed to each other. The connection annulus includes a resistance portion, and the rotation annulus has a plurality of teeth in a ring-shaped arrangement. The oil film is arranged in a space surroundingly defined by the rotation annulus, the resistance annulus, and the resistance portion. The driver is engaged with at least one of the teeth, and a relative position of the driver and the connection tube is fixed. The driver is configured to rotate at least one of the teeth, such that the rotation ring and the resistance annulus are jointly rotated relative to the resistance portion, and generate a rotation resistance force through the oil film.

10 Claims, 10 Drawing Sheets

CAMERA ROTATION DEVICE, MONOCULAR TELESCOPE, AND ROTATION MECHANISM OF MONOCULAR TELESCOPE

CROSS-REFERENCE TO RELATED PATENT APPLICATION

This application claims the benefit of priority to Taiwan Patent Application No. 112125922, filed on Jul. 12, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a monocular telescope, and more particularly to a camera device, a monocular telescope, and a rotation mechanism of a monocular telescope.

BACKGROUND OF THE DISCLOSURE

A conventional monocular telescope includes a mechanism that enables a camera to be rotated through a ball bearing thereof. However, when the ball bearing is in operation, a rotation angle of the camera is difficult to be precisely controlled due to a low friction of the ball bearing. Moreover, balls of the ball bearing tend to be disposed slightly lower than its predetermined position due to the effect of gravity, thereby easily generating an offset of the camera.

SUMMARY OF THE DISCLOSURE

In response to the above-referenced technical inadequacies, the present disclosure provides a camera device, a monocular telescope, and a rotation mechanism of a monocular telescope for effectively improving on the issues associated with conventional monocular telescope.

In order to solve the above-mentioned problems, one of the technical aspects adopted by the present disclosure is to provide a monocular telescope, which includes a telescope body, a camera rotation device, and a camera device. The telescope body has an observation end and an assembling end that is opposite to the observation end. The camera rotation device includes a connection tube, a rotation annulus, a resistance annulus, an oil film, and a driver. The connection tube is detachably assembled to the assembling end of the telescope body and has a resistance portion formed on an outer surface thereof. The outer surface of the connection tube is divided into a front segment and a rear segment through the resistance portion. The rotation annulus is sleeved at the rear segment of the connection tube. The rotation annulus has a plurality of teeth arranged on an outer side thereof and being in a ring-shaped arrangement. The resistance annulus is sleeved at the front segment of the connection tube and is fixed to the rotation annulus. The rotation annulus, the resistance annulus, and the resistance portion jointly define an accommodating space. The oil film is arranged in the accommodating space. The driver includes a motor and a transmission mechanism that is engaged with at least one of the teeth. A relative position between the driver and the connection tube is fixed. The camera device is detachably assembled to the rotation annulus of the camera rotation device. When the motor of the driver drives the transmission mechanism to push at least one of the teeth by receiving an electrical signal, the rotation annulus and the resistance annulus are rotated to move the camera device relative to the resistance portion for jointly implementing a rotation process, and synchronously generate a rotation resistance force in the rotation process through the oil film.

In order to solve the above-mentioned problems, another one of the technical aspects adopted by the present disclosure is to provide a camera rotation device, which includes a carrier, a connection tube, a rotation annulus, a resistance annulus, an oil film, and a driver. The connection tube is detachably assembled to the carrier and has a resistance portion formed on an outer surface thereof. The outer surface of the connection tube is divided into a front segment and a rear segment through the resistance portion. The rotation annulus is sleeved at the rear segment of the connection tube. The rotation annulus has a plurality of teeth arranged on an outer side thereof and being in a ring-shaped arrangement. The resistance annulus is sleeved at the front segment of the connection tube and is fixed to the rotation annulus. The rotation annulus, the resistance annulus, and the resistance portion jointly define an accommodating space. The oil film is arranged in the accommodating space. The driver is assembled to the carrier to fix a relative position between the driver and the connection tube. The driver includes a motor and a transmission mechanism that is engaged with at least one of the teeth. When the motor of the driver drives the transmission mechanism to push at least one of the teeth by receiving an electrical signal, the rotation annulus and the resistance annulus are rotated to move the camera device relative to the resistance portion for jointly implementing a rotation process, and synchronously generate a rotation resistance force in the rotation process through the oil film.

In order to solve the above-mentioned problems, yet another one of the technical aspects adopted by the present disclosure is to provide a rotation mechanism of a monocular telescope, which includes a connection tube, a rotation annulus, a resistance annulus, and an oil film. The connection tube has a resistance portion formed on an outer surface thereof. The outer surface of the connection tube is divided into a front segment and a rear segment through the resistance portion. The rotation annulus is sleeved at the rear segment of the connection tube. The rotation annulus has a plurality of teeth arranged on an outer side thereof and being in a ring-shaped arrangement. The resistance annulus is sleeved at the front segment of the connection tube and is fixed to the rotation annulus. The rotation annulus, the resistance annulus, and the resistance portion jointly define an accommodating space. The oil film is arranged in the accommodating space. When at least one of the teeth of the rotation mechanism is pushed, the rotation annulus and the resistance annulus are rotated relative to the resistance portion for jointly implementing a rotation process, and synchronously generate a rotation resistance force in the rotation process through the oil film.

Therefore, any one of the camera rotation device, the monocular telescope, and the rotation mechanism provided by the present disclosure does not easily have an offset caused by the effect of gravity through the cooperation of the components thereof (e.g., the cooperation of the connection tube, the rotation annulus, the resistance annulus, and the oil film), and the rotation mechanism can have the rotation resistance force of a higher value in the rotation process, thereby precisely controlling a rotation angle of the rotation mechanism.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 1:
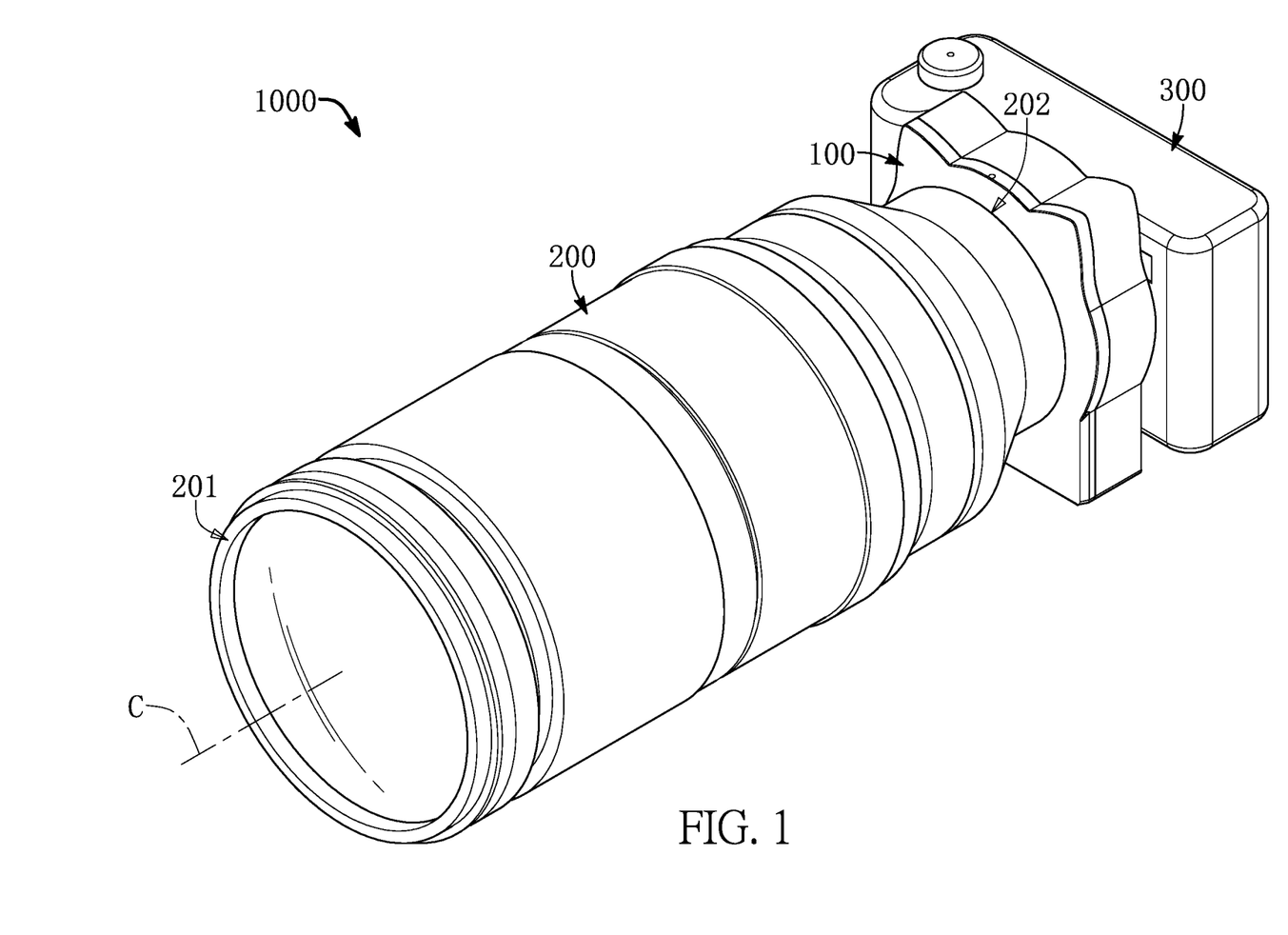
FIG. 1 is a schematic perspective view of a monocular telescope according to an embodiment of the present disclosure.
Figure 2:
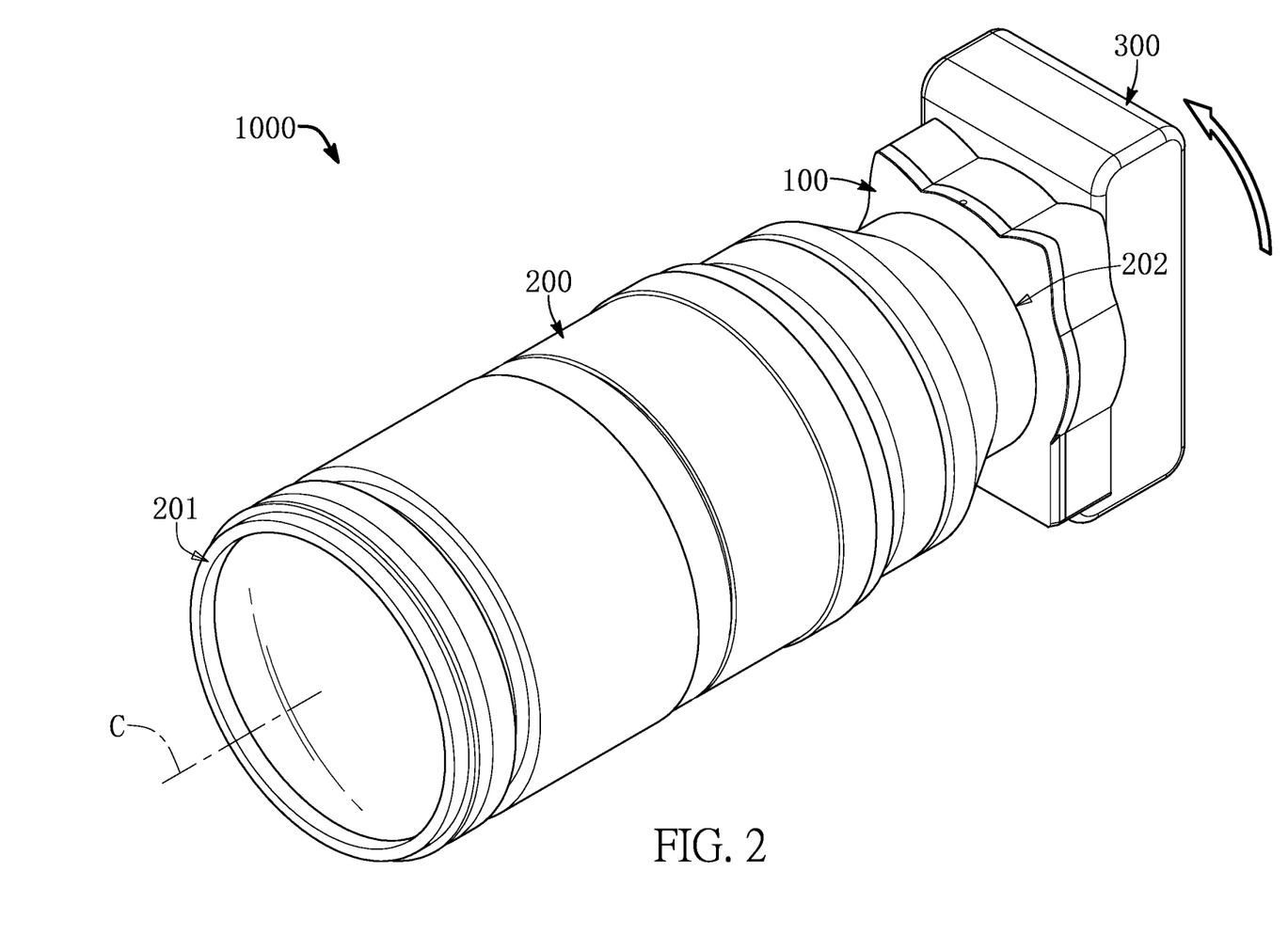
FIG. 2 is a schematic perspective view showing the monocular telescope of FIG. 1 that is in operation.
Figure 3:
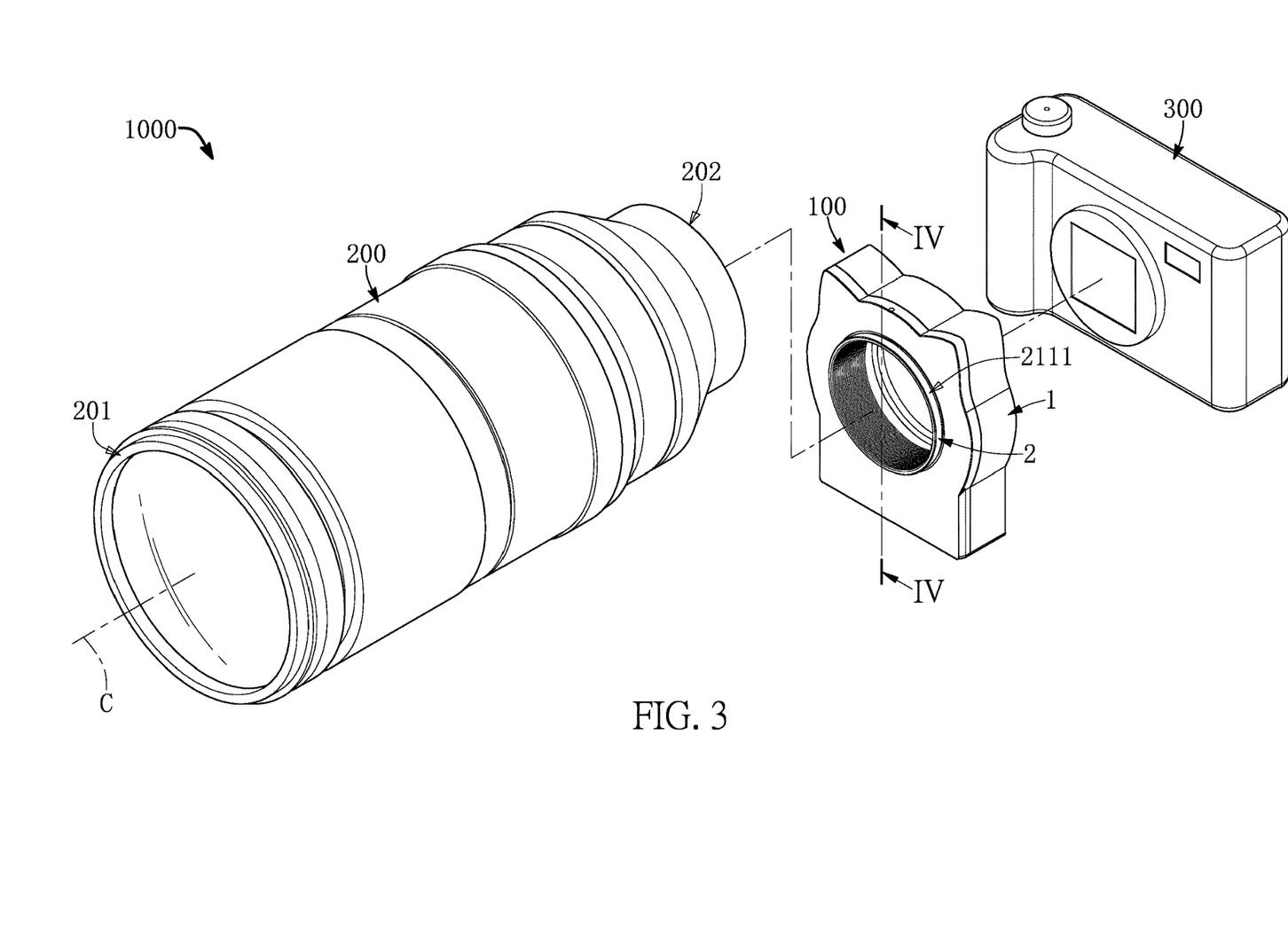
FIG. 3 is a schematic exploded view of FIG. 1.
Figure 4:
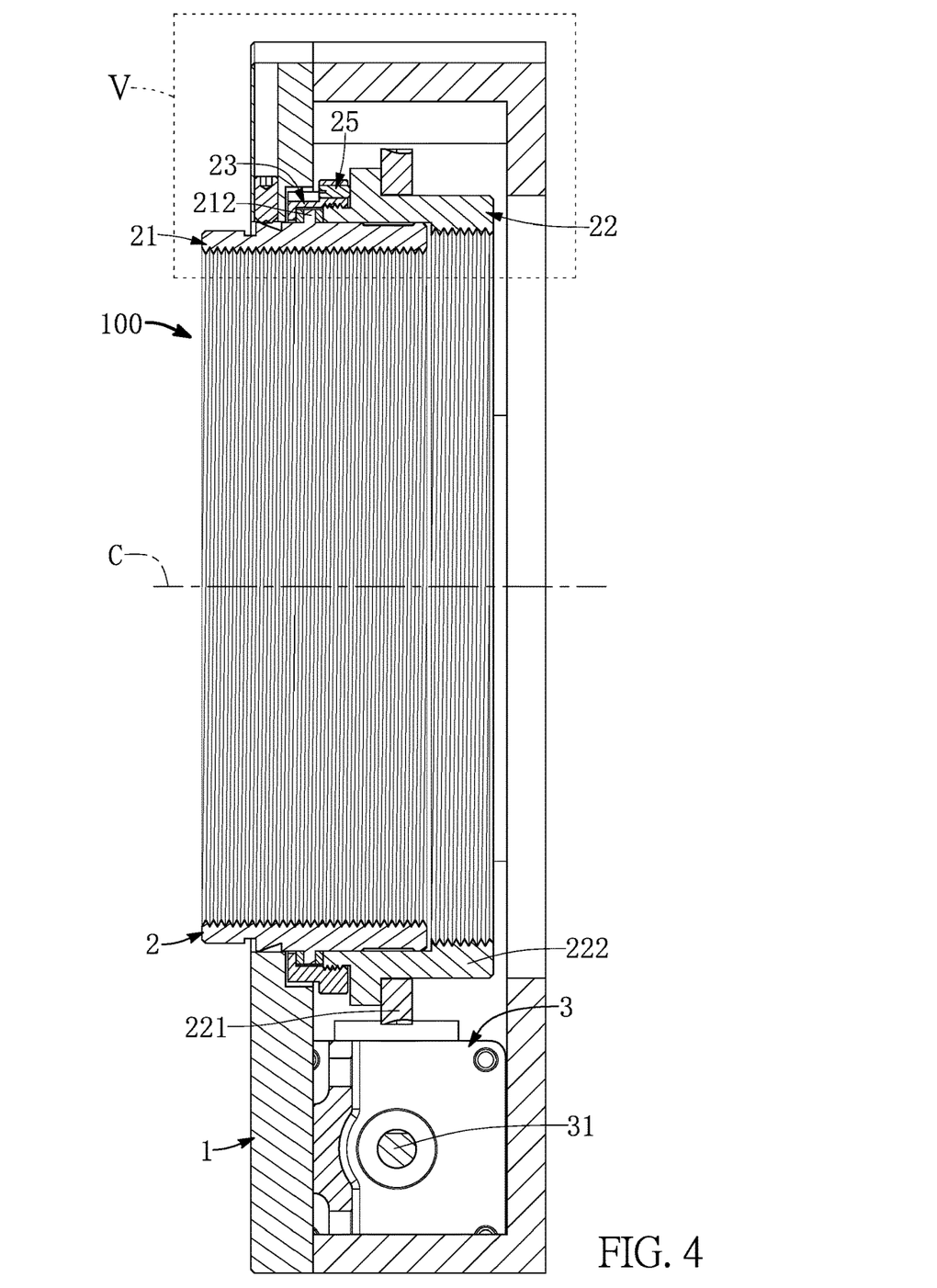
FIG. 4 is a schematic cross-sectional view taken along line IV-IV of FIG. 3.
Figure 5:
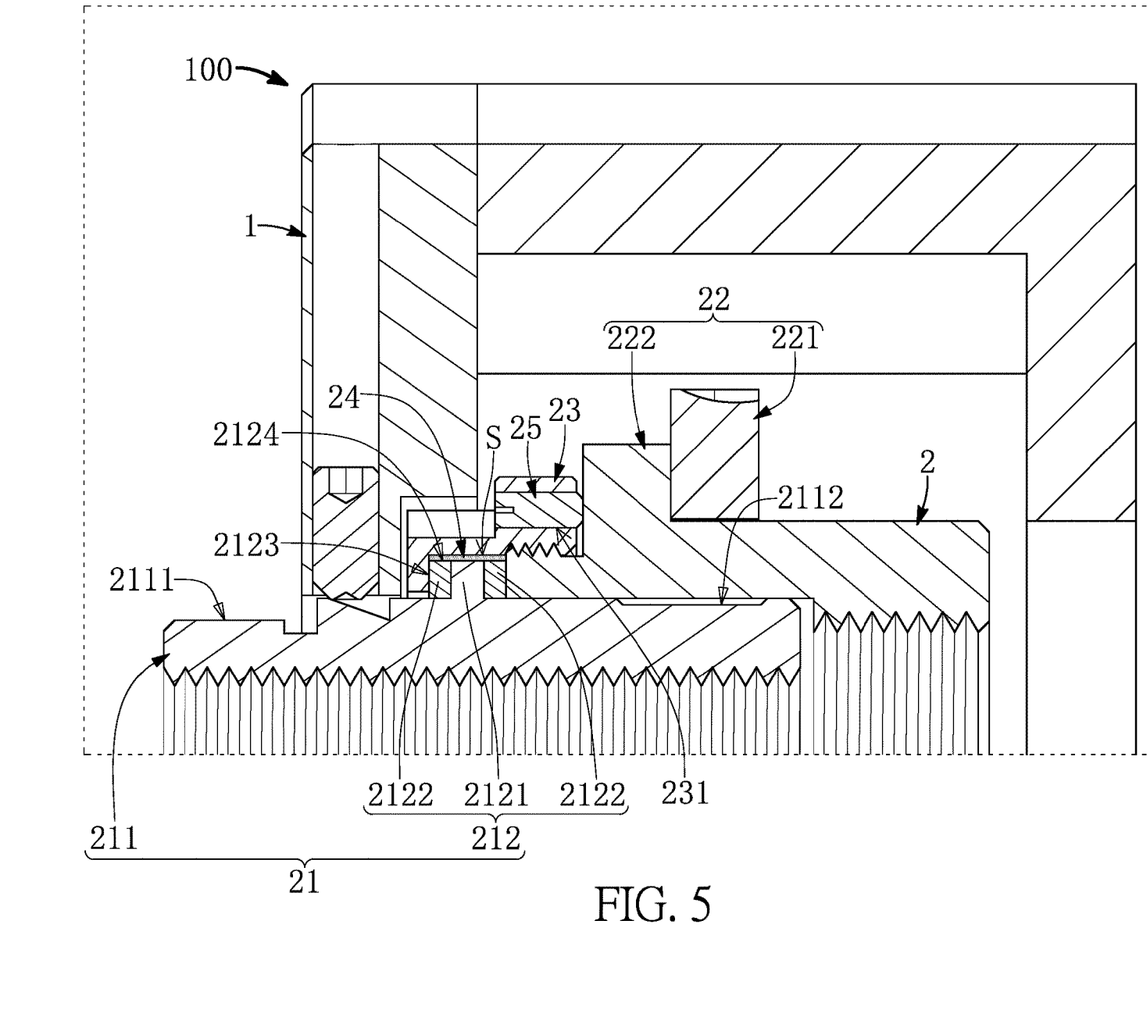
FIG. 5 is a schematic enlarged view of part V of FIG. 4.
Figure 6:
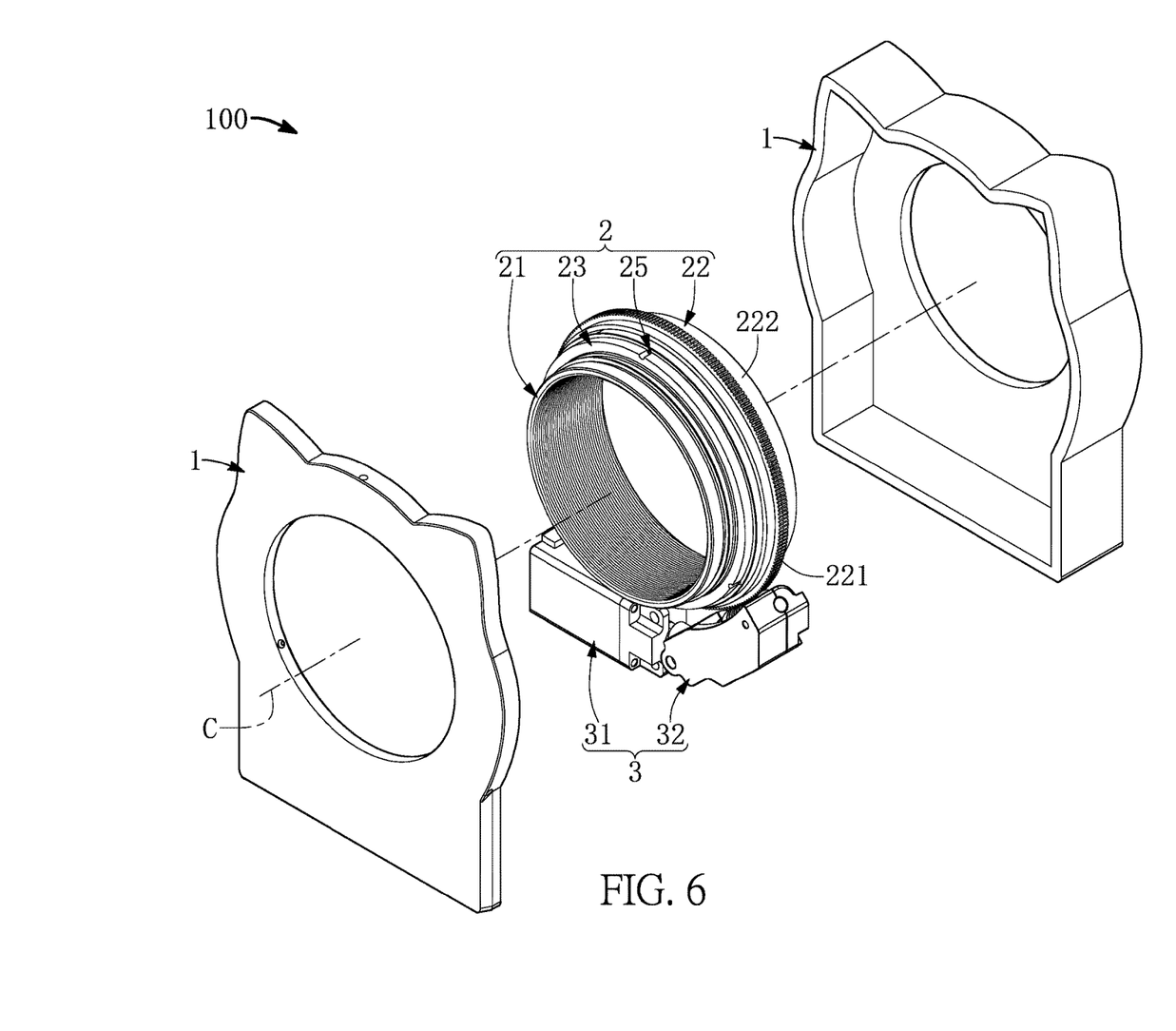
FIG. 6 is a schematic exploded view of a camera device of FIG. 3.
Figure 7:
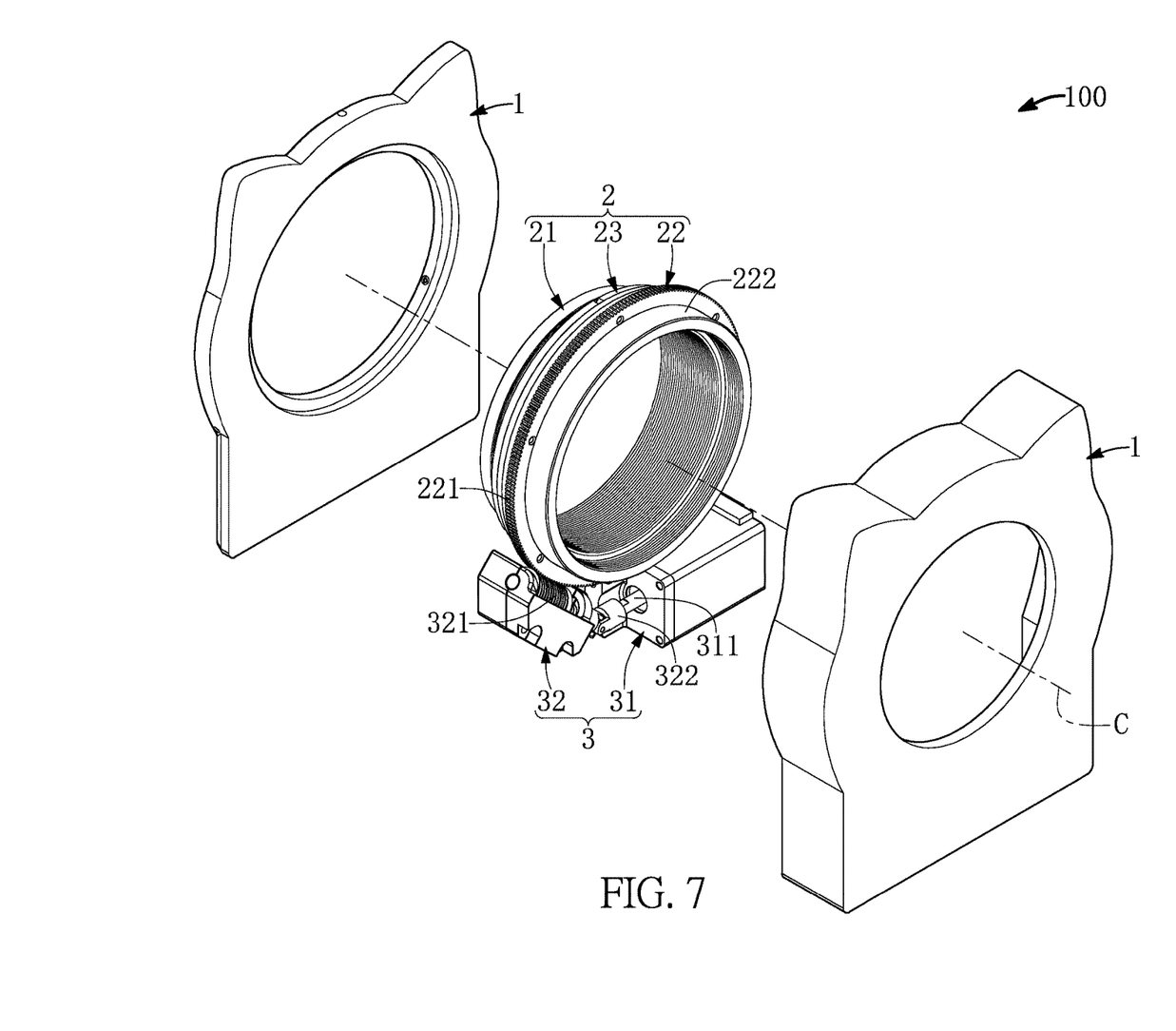
FIG. 7 is a schematic exploded view of the camera device of FIG. 3 from another angle of view.

Referring to FIG. 1 to FIG. 10, an embodiment of the present disclosure provides a monocular telescope 1000 (e.g., an astronomical telescope). In other words, any telescope not having a monocular type is different from the monocular telescope 1000 provided by the present embodiment. As shown in FIG. 1 to FIG. 3, the monocular telescope 1000 includes a camera rotation device 100, a telescope body 200 detachably assembled to one side of the camera rotation device 100, and a camera device 300 that is detachably assembled to another side of the camera rotation device 100. The camera device 300 can be rotated relative to the telescope body 200 through the camera rotation device 100.

It should be noted that the camera rotation device 100 in the present embodiment is described in cooperation with the telescope body 200 and the camera device 300, but the present disclosure is not limited thereto. For example, in other embodiments of the present disclosure not shown in the drawings, the camera rotation device 100 can be independently used (e.g., sold) or can be used in cooperation with other devices.

In the present embodiment, the telescope body 200 has an observation end 201 and an assembling end 202 that is opposite to the observation end 201, and an interior structure of the telescope body 200 can be adjusted or changed according to design requirements, but the present disclosure is not limited thereto. The telescope body 200 in the present embodiment defines a central optical axis C passing through a center of the observation end 201 and a center of the assembling end 202.

As shown in FIG. 4 to FIG. 7, the camera rotation device 100 includes a carrier 1, a rotation mechanism 2 assembled to the carrier 1, and a driver 3 that is assembled to the carrier 1. The carrier 1 in the present embodiment is a box-like structure formed by assembling two pieces, and the carrier 1 is preferably not in contact with the camera device 300 (as shown in FIG. 1 and FIG. 2), but the present disclosure is not limited thereto.

It should be noted that the rotation mechanism 2 in the present embodiment is described in cooperation with the carrier 1 and the driver 3, but the present disclosure is not limited thereto. For example, in other embodiments of the present disclosure not shown in the drawings, the rotation mechanism 2 can be independently used (e.g., sold) or can be used in cooperation with other components.

Specifically, as shown in FIG. 4, FIG. 5, FIG. 8, and FIG. 9, the rotation mechanism 2 has a substantially cylindrical shape having a central line that is preferably overlapped with the central optical axis C. The rotation mechanism 2 includes a connection tube 21, a rotation annulus 22, a resistance annulus 23, and an oil film 24. The rotation annulus 22 and the resistance annulus 23 are respectively sleeved at two opposite sides of the connection tube 21. The connection tube 21 includes a tube body 211 and a resistance portion 212 that is formed on an outer surface of the tube body 211. The outer surface of the tube body 211 is divided into a front segment 2111 and a rear segment 2112 through the resistance portion 212.

Specifically, the resistance portion 212 of the connection tube 21 in the present embodiment is ring-shaped, and includes a middle ring 2121 integrally formed on the tube body 211 and two metal rings 2122. The two metal rings 2122 are sleeved at the tube body 211 and respectively abut against two opposite sides of the middle ring 2121. In other words, the front segment 2111 and the rear segment 2112 of the tube body 211 are respectively arranged at two opposite sides of the two metal rings 2122 away from each other.

Moreover, a material of each of the two metal rings 2122 (e.g., a copper metal) is different from a material of the middle ring 2121 (e.g., an aluminum metal). The middle ring 2121 is sandwiched between the two metal rings 2122 along a direction parallel to the central optical axis C, and a top side of the middle ring 2121 is substantially flush with top sides of the two metal rings 2122. In the present embodiment, the two metal rings 2122 are preferably in a mirror-symmetrical arrangement with respect to the middle ring 2121, but the present disclosure is not limited thereto.

The rotation annulus 22 is sleeved at the rear segment 2112 of the connection tube 21, and the resistance annulus 23 is sleeved at the front segment 2111 of the connection tube 21 and is fixed to the rotation annulus 22, so that the rotation annulus 22, the resistance annulus 23, and the resistance portion 212 jointly define an accommodating space S. The accommodating space S is substantially sealed and is provided to receive the oil film 24 therein, and the fixing manner between the resistance annulus 23 and the rotation annulus 22 in the present embodiment is through threaded engagement, but the present disclosure is not limited thereto.

Specifically, in order to further improve the fixing stability between the resistance annulus 23 and the rotation annulus 22, the resistance annulus 23 can have a plurality of thread holes 231 formed toward the rotation annulus 22 and penetrating therethrough, and the rotation mechanism 2 (or the camera rotation device 100) can include a plurality of adjustment bolts 25 that are respectively threaded in the thread holes 231 and that abut against the rotation annulus 22, thereby increasing a friction between the resistance annulus 23 and the rotation annulus 22 and enabling the resistance annulus 23 and the rotation annulus 22 to be synchronously rotated.

Moreover, the material of each of the two metal rings 2122 is copper metal that is different from materials (e.g., aluminum metals) of the rotation annulus 22 and the resistance annulus 3. In the present embodiment, the rotation annulus 22 and the resistance annulus 23 respectively abut against two lateral sides 2123 of the two metal rings 2122 arranged away from each other, and the resistance annulus 23 is spaced apart from and covers the top sides of the middle ring 2121 and the two metal rings 2122.

In other words, the resistance portion 212 has the two lateral sides 2123 (of the two metal rings 2122 arranged away from each other) and a top side 2124 that is connected to the two lateral sides 2123 (and that is arranged on the middle ring 2121 and the two metal rings 2122). The rotation annulus 22 and the resistance annulus 23 respectively abut against the two lateral sides 2123 of the resistance portion 212 (e.g., the resistance portion 212 can be sandwiched between the rotation annulus 22 and the resistance annulus 23), and the resistance annulus 23 is spaced apart from and covers the top side 2124 of the resistance portion 212 for defining the accommodating space S.

Figure 8:
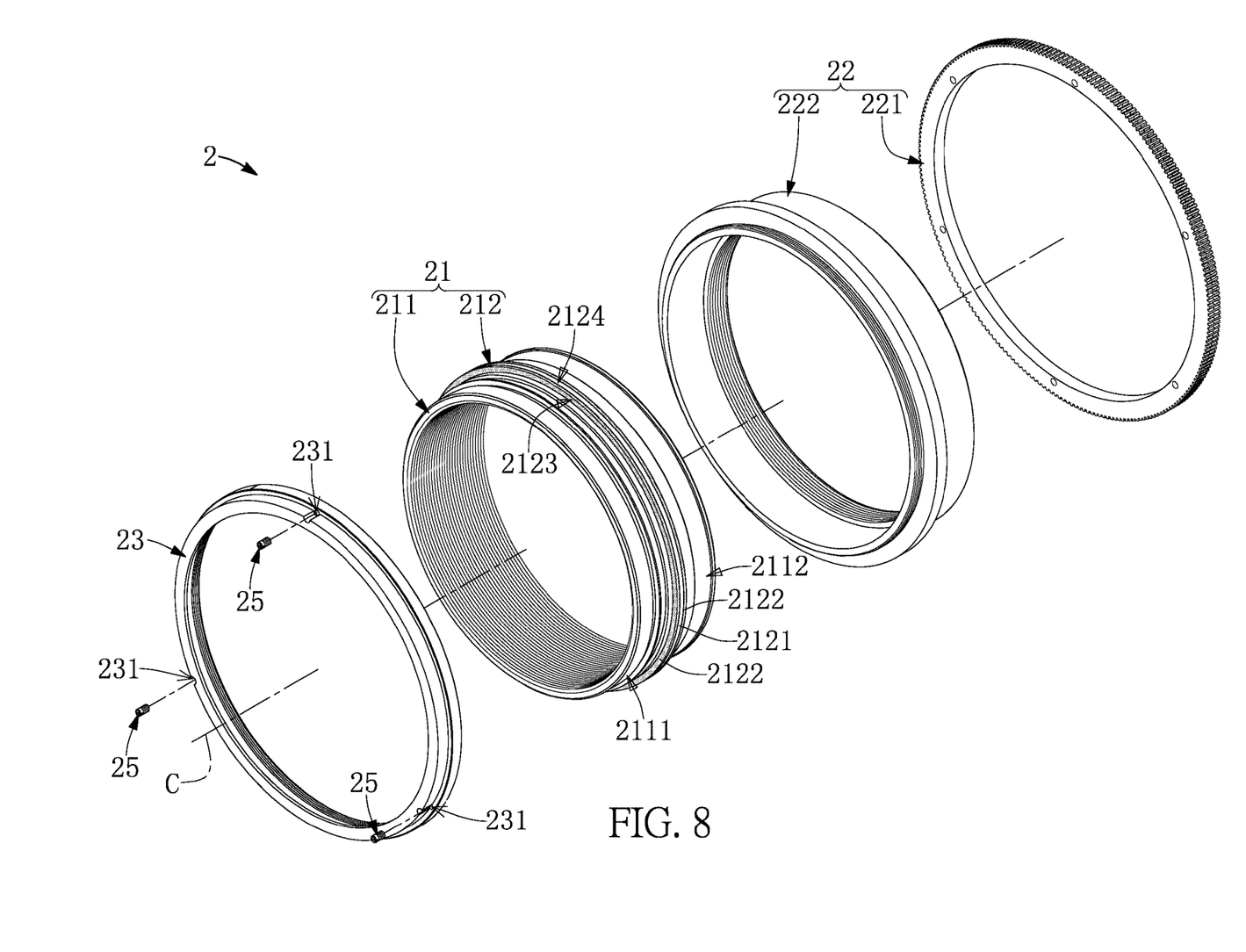
FIG. 8 is a schematic exploded view of a rotation mechanism of FIG. 6.
Figure 9:
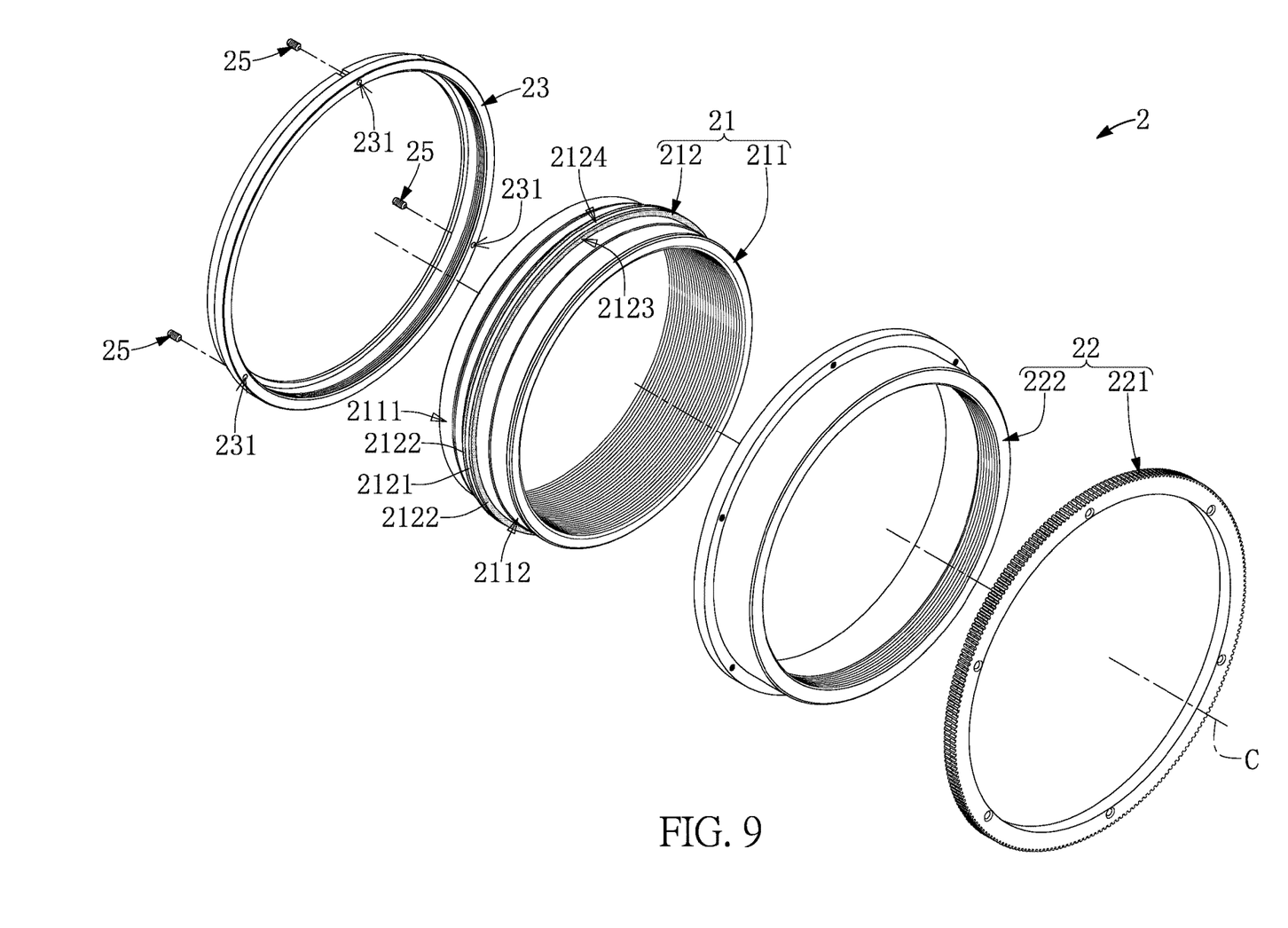
FIG. 9 is a schematic exploded view of the rotation mechanism of FIG. 7.
Figure 10:
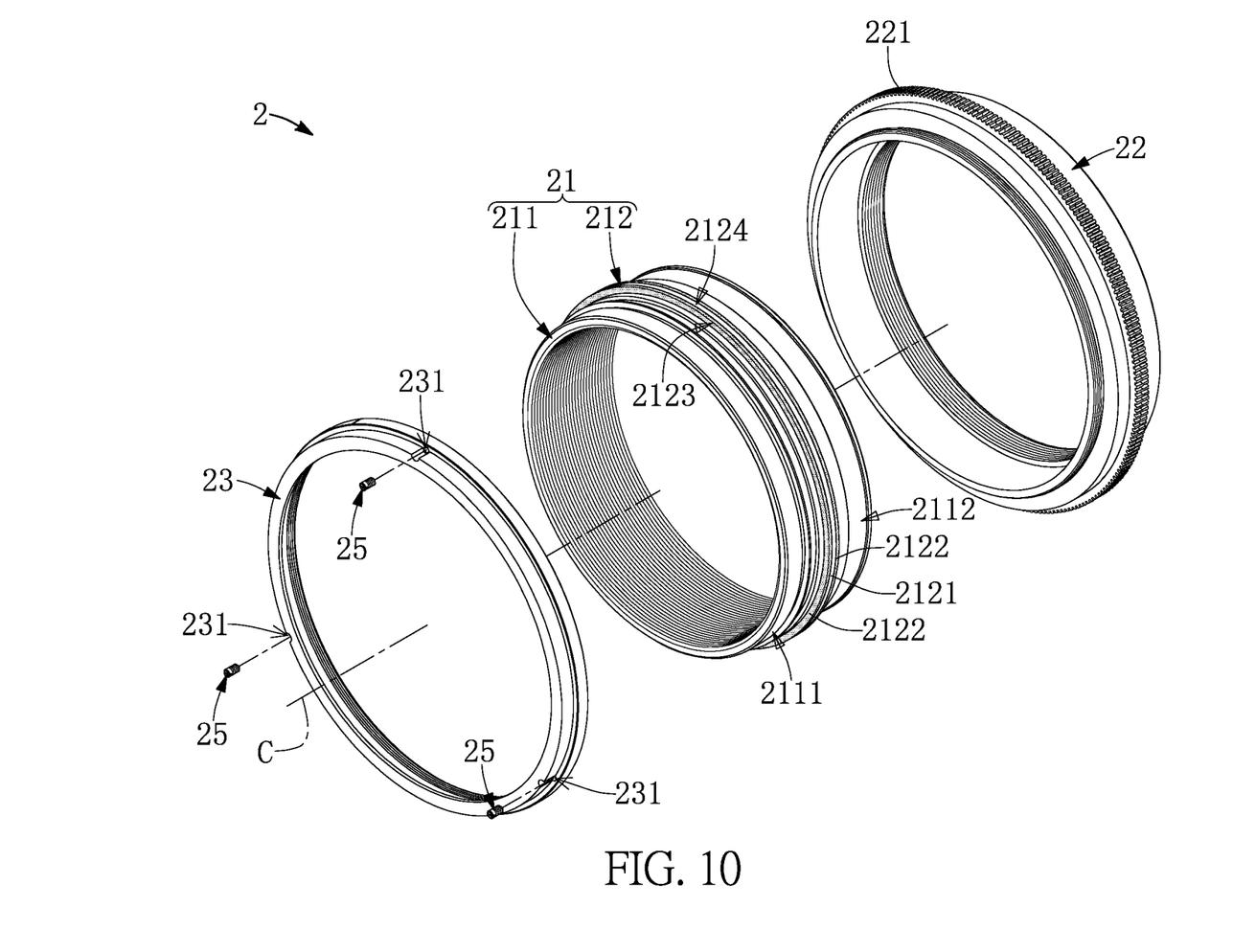
FIG. 10 is a schematic exploded view of the rotation mechanism in another configuration according to the embodiment of the present disclosure.

In addition, the rotation annulus 22 has a plurality of teeth 221 arranged on an outer side thereof and being in a ring-shaped arrangement. The teeth 221 are sequentially connected, and the configuration of the teeth 221 can be adjusted or changed according to design requirements. For example, as shown in FIG. 8 and FIG. 9, the rotation annulus 22 includes a ring-shaped body 222, and the teeth 221 are integrally formed as a ring-shaped rack detachably assembled to the ring-shaped body 222; or, as shown in FIG. 10, the teeth 221 are integrally formed on the outer side of the rotation annulus 22.

In summary, when at least one of the teeth 221 of the rotation mechanism 2 is pushed, the rotation annulus 22 and the resistance annulus 23 are rotated relative to the resistance portion 212 for jointly implementing a rotation process, and synchronously generate a rotation resistance force in the rotation process through the oil film 24. Accordingly, the rotation mechanism 2 provided by the present embodiment does not easily have an offset caused by the effect of gravity through the cooperation of the components thereof, and the rotation mechanism 2 can have a higher rotation resistance force in the rotation process, thereby precisely controlling a rotation angle of the rotation mechanism 2.

Specifically, a quantity of the teeth 221 of the rotation annulus 22 can be adjusted or changed according to design requirements, and any one degree of the central angle of the rotation annulus 22 is preferably provided with at least one of the teeth 221, thereby further precisely controlling the rotation angle of the rotation mechanism 2.

As shown in FIG. 3 to FIG. 5 and FIG. 7, the camera rotation device 2 can be detachably assembled to the assembling end 202 of the telescope body 200 through the connection tube 21 (e.g., the tube body 211). For example, the front segment 2111 of the tube body 211 passes through and is fixed to the carrier 1, a portion of the front segment 2111 protruding from the carrier 1 is threaded to the assembling end 202, and a larger portion of the rotation mechanism 21 and the driver 3 are disposed in the carrier 1. The connection tube 21 and the driver 3 in the present embodiment are assembled to the carrier 1 so as to fix a relative position therebetween, but the present disclosure is not limited thereto.

Moreover, the driver 3 includes a motor 31 and a transmission mechanism 32 that is engaged with at least one of the teeth 221. The motor 31 is configured to drive the transmission mechanism 32 to push at least one of the teeth 221 by receiving an electrical signal, thereby wirelessly controlling the camera rotation device 100. The specific structure of the transmission mechanism 32 can be adjusted or changed according to design requirements, and the present disclosure is not limited thereto.

In the present embodiment, the transmission mechanism 32 includes a worm gear 321 and a universal joint 322. The worm gear 321 is engaged with at least one of the teeth 221, and the universal joint 322 connects the worm gear 321 and an output shaft 311 of the motor 31 to enable the worm gear 321 and the output shaft 311 to be non-parallel to each other, thereby reducing the volume of the camera rotation device 100 (or the carrier 1).

The camera device 300 is detachably assembled to the rotation annulus 22 of the camera rotation device 100, and the camera device 300 and the rotation annulus 22 in the present embodiment are fixed to each other in a threaded manner, but the present disclosure is not limited thereto.

In summary, when the motor 31 of the driver 3 drives the transmission mechanism 32 (e.g., the worm gear 321) to push at least one of the teeth 221 by receiving the electrical signal, the rotation annulus 22 and the resistance annulus 23 are rotated to move the camera device 300 relative to the resistance portion 212 for jointly implementing the rotation process (as shown in FIG. 1 and FIG. 2), and synchronously generate the rotation resistance force in the rotation process through the oil film 24.

Beneficial Effects of the Embodiment

In conclusion, any one of the camera rotation device, the monocular telescope, and the rotation mechanism provided by the present disclosure does not easily have an offset caused by the effect of gravity, through the cooperation of the components thereof (e.g., the cooperation of the connection tube, the rotation annulus, the resistance annulus, and the oil film), and the rotation mechanism can have the rotation resistance force of a higher value in the rotation process, thereby precisely controlling a rotation angle of the rotation mechanism.

Moreover, in the camera rotation device provided by the present disclosure, for facilitating the generation of the rotation resistance force from the oil film, the rotation mechanism preferably includes at least part of the following features: the rotation annulus and the resistance annulus respectively abut against the two lateral sides of the resistance portion (or the two metal rings), the resistance annulus is spaced apart from and covers the top side of the resistance portion, and the material of each of the two metal rings is different from the material of the middle ring, the material of the rotation annulus, and the material of the resistance annulus.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A monocular telescope, comprising:
    a telescope body having an observation end and an assembling end that is opposite to the observation end;
    a camera rotation device including:
        a connection tube detachably assembled to the assembling end of the telescope body and having a resistance portion formed on an outer surface thereof, wherein the outer surface of the connection tube is divided into a front segment and a rear segment through the resistance portion;
        a rotation annulus sleeved at the rear segment of the connection tube, wherein the rotation annulus has a plurality of teeth arranged on an outer side thereof and being in a ring-shaped arrangement;
        a resistance annulus sleeved at the front segment of the connection tube and fixed to the rotation annulus, wherein the rotation annulus, the resistance annulus, and the resistance portion jointly define an accommodating space;
        an oil film arranged in the accommodating space; and
        a driver including a motor and a transmission mechanism that is engaged with at least one of the teeth, wherein a relative position between the driver and the connection tube is fixed; and
    a camera device detachably assembled to the rotation annulus of the camera rotation device, wherein, when the motor of the driver drives the transmission mechanism to push at least one of the teeth by receiving an electrical signal, the rotation annulus and the resistance annulus are rotated to move the camera device relative to the resistance portion for jointly implementing a rotation process, and synchronously generate a rotation resistance force in the rotation process through the oil film.

2. The monocular telescope according to claim 1, wherein the resistance portion is ring-shaped and has two lateral sides and a top side that is connected to the two lateral sides, and wherein the rotation annulus and the resistance annulus respectively abut against the two lateral sides of the resistance portion, and the resistance annulus is spaced apart from and covers the top side of the resistance portion.

3. The monocular telescope according to claim 1, wherein the connection tube includes a tube body assembled to the assembling end, and the resistance portion of the connection tube includes:
    a middle ring integrally formed on the tube body; and
    two metal rings sleeved at the tube body and respectively abutting against two opposite sides of the middle ring, wherein a material of each of the two metal rings is different from a material of the middle ring.

4. The monocular telescope according to claim 3, wherein the material of each of the two metal rings is copper metal that is different from materials of the rotation annulus and the resistance annulus.

5. The monocular telescope according to claim 1, wherein the resistance annulus has a plurality of thread holes formed toward the rotation annulus and penetrating therethrough, and the camera rotation device includes a plurality of adjustment bolts that are respectively threaded in the thread holes and that abut against the rotation annulus.

6. The monocular telescope according to claim 1, wherein the rotation annulus includes a ring-shaped body, and the teeth are integrally formed as a ring-shaped rack detachably assembled to the ring-shaped body; or, the teeth are integrally formed on the outer side of the rotation annulus.

7. The monocular telescope according to claim 1, wherein the camera rotation device includes a carrier that is not in contact with the camera device, and the connection tube and the driver are assembled to the carrier so as to fix the relative position between the connection tube and the driver, and wherein, the transmission mechanism includes:
    a worm gear engaged with at least one of the teeth; and
    a universal joint that connects the worm gear and an output shaft of the motor to enable the worm gear and the output shaft to be non-parallel to each other.

8. A camera rotation device, comprising:
    a carrier;
    a connection tube detachably assembled to the carrier and having a resistance portion formed on an outer surface thereof, wherein the outer surface of the connection tube is divided into a front segment and a rear segment through the resistance portion;
    a rotation annulus sleeved at the rear segment of the connection tube, wherein the rotation annulus has a plurality of teeth arranged on an outer side thereof and being in a ring-shaped arrangement;
    a resistance annulus sleeved at the front segment of the connection tube and fixed to the rotation annulus, wherein the rotation annulus, the resistance annulus, and the resistance portion jointly define an accommodating space;
    an oil film arranged in the accommodating space; and
    a driver assembled to the carrier to fix a relative position between the driver and the connection tube, wherein the driver includes a motor and a transmission mechanism that is engaged with at least one of the teeth;

wherein, when the motor of the driver drives the transmission mechanism to push at least one of the teeth by receiving an electrical signal, the rotation annulus and the resistance annulus are rotated to move the camera device relative to the resistance portion for jointly implementing a rotation process, and synchronously generate a rotation resistance force in the rotation process through the oil film.

9. The camera rotation device according to claim 8, wherein the resistance annulus has a plurality of thread holes formed toward the rotation annulus and penetrating therethrough, and the camera device includes a plurality of adjustment bolts that are respectively threaded in the thread holes and that abut against the rotation annulus, wherein the connection tube includes a tube body, and the resistance portion of the connection tube is ring-shaped and includes:
- a middle ring integrally formed on the tube body; and
- two metal rings sleeved at the tube body and respectively abutting against two opposite sides of the middle ring, wherein a material of each of the two metal rings is different from a material of the middle ring;

wherein the rotation annulus and the resistance annulus respectively abut against two lateral sides of the two metal rings arranged away from each other, and the resistance annulus is spaced apart from and covers top sides of the middle ring and the two metal rings.

10. A rotation mechanism of a monocular telescope, comprising:
- a connection tube having a resistance portion formed on an outer surface thereof, wherein the outer surface of the connection tube is divided into a front segment and a rear segment through the resistance portion;
- a rotation annulus sleeved at the rear segment of the connection tube, wherein the rotation annulus has a plurality of teeth arranged on an outer side thereof and being in a ring-shaped arrangement;
- a resistance annulus sleeved at the front segment of the connection tube and fixed to the rotation annulus, wherein the rotation annulus, the resistance annulus, and the resistance portion jointly define an accommodating space; and
- an oil film arranged in the accommodating space;

wherein, when at least one of the teeth of the rotation mechanism is pushed, the rotation annulus and the resistance annulus are rotated relative to the resistance portion for jointly implementing a rotation process, and synchronously generate a rotation resistance force in the rotation process through the oil film.

\* \* \* \* \*